United States Patent
Jang et al.

(10) Patent No.: US 10,607,488 B2
(45) Date of Patent: Mar. 31, 2020

(54) APPARATUS AND METHOD OF PROVIDING VISUALIZATION INFORMATION OF REAR VEHICLE

(71) Applicants: Hyundai Motor Company, Seoul (KR); Kia Motors Corporation, Seoul (KR)

(72) Inventors: Yoon Ho Jang, Gyeonggi-do (KR); Jae Kwang Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/708,495

(22) Filed: Sep. 19, 2017

(65) Prior Publication Data

US 2018/0165964 A1   Jun. 14, 2018

(30) Foreign Application Priority Data

Dec. 9, 2016   (KR) .................. 10-2016-0167410

(51) Int. Cl.
| | | |
|---|---|---|
| G08G 1/16 | (2006.01) | |
| H04R 1/40 | (2006.01) | |
| H04R 29/00 | (2006.01) | |
| H04R 1/02 | (2006.01) | |
| B60K 35/00 | (2006.01) | |
| B60R 1/00 | (2006.01) | |
| G01S 5/20 | (2006.01) | |
| G01S 5/18 | (2006.01) | |
| G01S 3/808 | (2006.01) | |
| H04R 3/00 | (2006.01) | |

(Continued)

(52) U.S. Cl.
CPC ............. *G08G 1/165* (2013.01); *B60K 35/00* (2013.01); *B60R 1/00* (2013.01); *G01S 3/8083* (2013.01); *G01S 5/18* (2013.01); *G01S 5/20* (2013.01); *G08G 1/167* (2013.01); *H04R 1/028* (2013.01); *H04R 1/406* (2013.01); *H04R 29/00* (2013.01); *B60K 2370/178* (2019.05); *B60K 2370/179* (2019.05); *B60K 2370/188* (2019.05); *B60R 2300/30* (2013.01); *B60R 2300/8066* (2013.01); *G06K 9/00798* (2013.01); *G06T 11/60* (2013.01); *H04R 3/005* (2013.01); *H04R 2430/23* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 2010/0228482 A1* | 9/2010 | Yonak | ................... | G01S 3/8083 701/301 |
| 2012/0154591 A1* | 6/2012 | Baur | ......................... | B60R 1/00 348/148 |
| 2015/0221321 A1* | 8/2015 | Christian | ............... | G08B 17/10 700/94 |

* cited by examiner

*Primary Examiner* — Nay Tun
*Assistant Examiner* — Shawna M Kingston
(74) *Attorney, Agent, or Firm* — Mintz Levin Cohn Ferris Glovsky and Popeo, P.C.; Peter F. Corless

(57) ABSTRACT

A method of providing visualization information of a rear vehicle includes calculating a location of a sound source located behind a host vehicle, using a sound signal received by each of a plurality of microphones, matching information about the location with an object displayed on image information generated by a rear camera, and displaying a first icon indicating the object on the image information, where the first icon includes information about a probability that (Continued)

the object is present in an area indicated by the location information.

11 Claims, 7 Drawing Sheets

(51) Int. Cl.
 *G06K 9/00* (2006.01)
 *G06T 11/60* (2006.01)

APPARATUS AND METHOD OF PROVIDING VISUALIZATION INFORMATION OF REAR VEHICLE

CROSS-REFERENCE TO RELATED APPLICATION

This application claims under 35 U.S.C. § 119(a) the benefit of Korean Patent Application No. 10-2016-0167410, filed on Dec. 9, 2016, the entire contents of which are incorporated by reference herein.

BACKGROUND (a) Technical Field

The present disclosure relates to an apparatus and method of providing visualization information of a rear vehicle, and more particularly, to an apparatus and method of recognizing a neighbor vehicle traveling around a vehicle by use of sound source tracking information so as to visually provide location information of the neighbor vehicle to a driver of the vehicle.

(b) Description of the Related Art

Various sounds are produced around a traveling vehicle. However, elderly drivers with poor hearing or drivers with poor sensory perception may not quickly process a specific sound (e.g., horn sound or siren sound) to which drivers should pay attention. In addition, due to the development of vehicle sound insulation, even persons having good hearing may often have difficulty accurately hearing sounds produced from the exterior of the vehicle. Furthermore, in the case in which a driver who has recognized a specific sound produced from the back of the vehicle looks behind in order to confirm the sound, this behavior may be unsafe.

Therefore, it is necessary to inform the driver of information about a specific sound, for example, information as to which sound is produced around the vehicle of the driver and in which direction the sound is produced, without hindering safe driving.

In addition to providing the driver with simple notification information, for example, information regarding which sound is produced around the vehicle and in which direction the sound is produced, providing auditory information to the driver in a visualized form on a display is needed without hindering driving in order to aid in overall driving control of the vehicle. In particular, an external sound of the vehicle may be converted into location information of a neighbor vehicle located around the vehicle, and the converted location information may be provided to the driver of the vehicle in the form of visualized information.

Accordingly, there is need for a detailed method of visually providing the location of a neighbor vehicle located around a host vehicle to a driver of the host vehicle by use of sound produced around the host vehicle while driving.

SUMMARY

Accordingly, the present disclosure is directed to an apparatus and method of providing visualization information of a rear vehicle to a driver.

Specifically, an object of the present disclosure is to provide an apparatus and method of providing visualization information of the rear vehicle, by calculating the location of the rear vehicle around a vehicle by use of sound tracking information and by providing the calculated location to the driver of the vehicle in a visualization manner.

The objects that can be achieved through the present disclosure are not limited to what has been particularly described hereinabove and other technical objects not described herein will be more clearly understood by persons skilled in the art from the following detailed description.

To achieve these objects and other advantages and in accordance with the purpose of the disclosure, as embodied and broadly described herein, a method of providing visualization information of a rear vehicle includes: calculating, by a controller, a location of a sound source located behind a host vehicle, using a sound signal received by each of a plurality of microphones; matching information about the location (hereinafter, location information), by the controller, with any one of at least one object displayed on image information generated by a rear camera; and displaying, by an output unit, a first icon indicating the object on the image information, wherein the first icon includes information about a probability (hereinafter, probability information) that the object is present in an area indicated by the location information.

According to an embodiment, the method may further include detecting lanes included in the image information, and displaying the detected lanes by matching the detected lanes with a second icon indicating lane information.

According to an embodiment, the matching may include detecting a first lane located between the host vehicle and the object from among the lanes included in the image information.

According to an embodiment, the location information may include information about an angle (hereinafter, angle information) between the host vehicle and the object.

According to an embodiment, the angle information may be information about an angle formed by a connection axis of the object and the center of the rear side of the host vehicle based on the rear side of the host vehicle as a reference axis.

According to an embodiment, the first icon may include, on the first lane, at least one sub-block which is vertical to the first lane at a crossing point between the connection axis and the first lane.

According to an embodiment, the probability information may be displayed as at least one figure indicating the probability considering the magnitude of the sound signal.

According to an embodiment, the probability information may be displayed as at least one figure indicating the probability considering a distance between the host vehicle and the object.

According to an embodiment, the sub-block may be represented as a different color or a different color depth according to the probability.

According to an embodiment, the sub-block may have a different height according to the probability.

In another aspect of the present disclosure, a method of providing visualization information of a rear vehicle includes calculating a location of a sound source located behind a host vehicle, using sound signals received by each of a plurality of microphones, matching information about the location (hereinafter, location information) with information about an angle (hereinafter, angle information) between the host vehicle and the sound source, and setting the center of a rear side of the host vehicle as the center of a semicircle and displaying, on a predetermined area of the semicircle, information about a probability (hereinafter, probability information) that the sound source is present in an area indicated by the angle information, wherein the angle information is information about an angle formed by a connection axis of the sound source and the center of the rear side of the host vehicle based on the rear side of the host vehicle as a reference axis.

According to an embodiment, the semicircle may include a sub-semicircle indicating the probability information and the sub-semicircle may include a layer having the same center as the semicircle.

According to an embodiment, the sub-semicircle may have a different color or a different color depth according to the probability.

In another aspect of the present disclosure, a computer-readable recording medium in which a program for executing the above method is recorded is provided.

In another aspect of the present disclosure, an apparatus for providing visualization information of a rear vehicle includes a plurality of microphones configured to receive a sound signal from a sound source located behind a host vehicle, a controller configured to calculate a location of the sound source, using the sound signal and match information about the location (hereinafter, location information) with any one of at least one object displayed on image information generated by a rear camera, and an output unit configured to display a first icon indicating the object on the image information, wherein the first icon includes information about a probability (hereinafter, probability information) that the object is present in an area indicated by the location information.

According to an embodiment, the controller may detect lanes included in the image information and the output unit may display the detected lanes by matching the detected lanes with a second icon indicating lane information.

According to an embodiment, the controller may detect a first lane located between the host vehicle and the object from among the lanes included in the image information.

According to an embodiment, the location information may include information about an angle (hereinafter, angle information) between the host vehicle and the object.

According to an embodiment, the angle information may be information about an angle formed by a connection axis of the object and the center of the rear side of the host vehicle based on the rear side of the host vehicle as a reference axis.

According to an embodiment, the first icon may include, on the first lane, at least one sub-block which is vertical to the first lane at a crossing point between the connection axis and the first lane.

According to an embodiment, the probability information may be displayed as at least one figure indicating the probability considering the magnitude of the sound signal.

According to an embodiment, the probability information may be displayed as at least one figure indicating the probability considering a distance between the host vehicle and the object.

According to an embodiment, the sub-block may be represented as a different color or a different color depth according to the probability.

According to an embodiment, the sub-block may have a different height according to the probability.

In another aspect of the present disclosure, an apparatus for providing visualization information of a rear vehicle includes a plurality of microphones configured to receive a sound signal from a sound source located behind a host vehicle, a controller configured to calculate a location of the sound source, using the sound signal and match information about the location (hereinafter, location information) with information about an angle (hereinafter, angle information) between the host vehicle and the sound source, and an output unit configured to set the center of a rear side of the host vehicle as the center of a semicircle and display, on a predetermined area of the semicircle, information about a probability (hereinafter, probability information) that the sound source is present in an area indicated by the angle information, wherein the angle information is information about an angle formed by a connection axis of the sound source and the center of the rear side of the host vehicle based on the rear side of the host vehicle as a reference axis.

According to an embodiment, the semicircle may include a sub-semicircle indicating the probability information and the sub-semicircle may include a layer having the same center as the semicircle.

According to an embodiment, the sub-semicircle may have a different color or a different color depth according to the probability.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
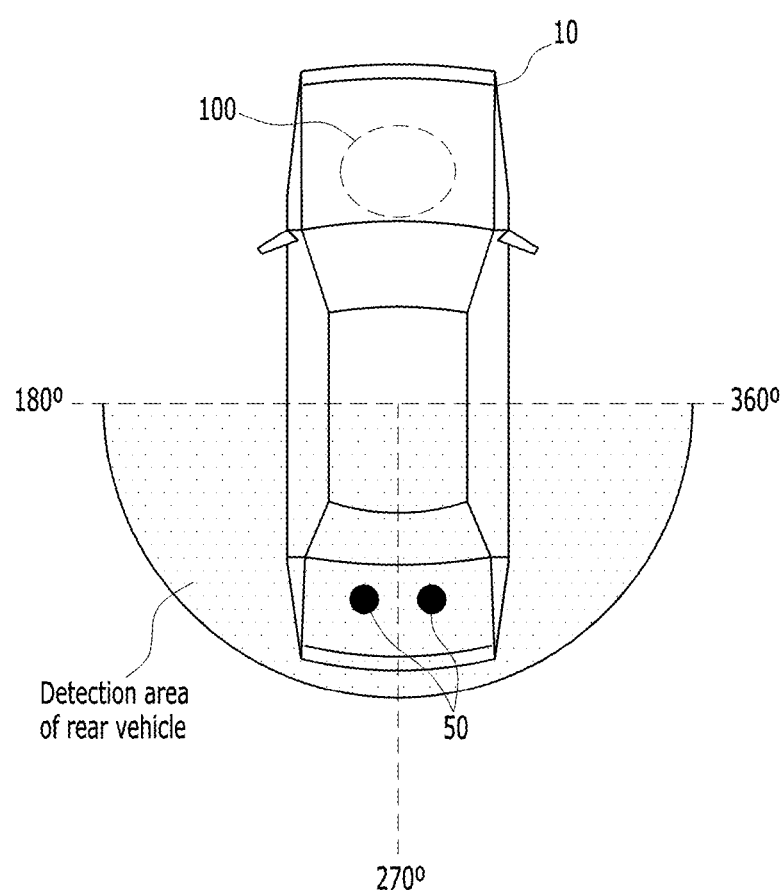
FIG. 1 is a schematic view of a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although all elements constituting the embodiments of the present disclosure are described as being integrated into a single one or operated as a single one, the present disclosure is not necessarily limited to such embodiments. According to embodiments, all of the elements may be selectively integrated into one or more and be operated as one or more within the object and scope of the present disclosure. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

In describing embodiments, when an element is referred to as being "on (over)" or "under (below)", "before (in front of)", or "after (behind)", this includes the meaning that two elements directly contact each other or one or more other elements are disposed between two elements.

Additionally, in describing the components of the present disclosure, terms like first, second, A, B, (a), and (b) are used. These are solely for the purpose of differentiating one component from another, and one of ordinary skill would understand that the terms do not imply or suggest the substances, order or sequence of the components. If a component is described as "connected", "coupled", or "linked" to another component, one of ordinary skill in the art would understand that the components are not necessarily directly "connected", "coupled", or "linked" but also are indirectly "connected", "coupled", or "linked" via a third component.

In addition, in the following description of the embodiments disclosed herein, a detailed description of related known technologies will be omitted when it may make the subject matter of the embodiments disclosed herein rather unclear.

FIG. 1 is a schematic view of a vehicle according to an embodiment of the present disclosure.

Referring to FIG. 1, a vehicle 10 may inform a driver thereof of information about a specific sound, for example, which sound is produced around the vehicle 10 and in which direction the sound is produced, while traveling according to manipulation of the driver.

The vehicle 10 may include multichannel microphones 50 capable of collecting an external sound of the vehicle 10 and a sound tracking device 100 capable of generating information about a specific sound based on sound information collected by the microphones 50. Each of the multichannel microphones 50 may be understood as one channel. The number (e.g., 2 or 3) of the multichannel microphones 50 and the installation location of the microphones 50 on the vehicle 10 are not limited to the example illustrated in FIG. 1.

If there are two multichannel microphones 50 as illustrated in FIG. 1, it is assumed that the sound information collected by the multichannel microphones 50 is used to generate a sound tracking result for a rear vehicle detection region (in the range of 180 to 360 degrees) of the sound tracking device 100 on the premise that sound detection of a neighbor vehicle is not needed with respect to a front region (in the range of 0 to 180 degrees) other than a back region (in the range of 180 to 360 degrees) of the sound tracking device 100.

The number of the multichannel microphones 50 and the installation location of the microphones 50 on the vehicle 10 are not limited to the example illustrated in FIG. 1.

A detailed operation of the sound tracking device 100 will be described later with reference to FIG. 2.

Figure 2:
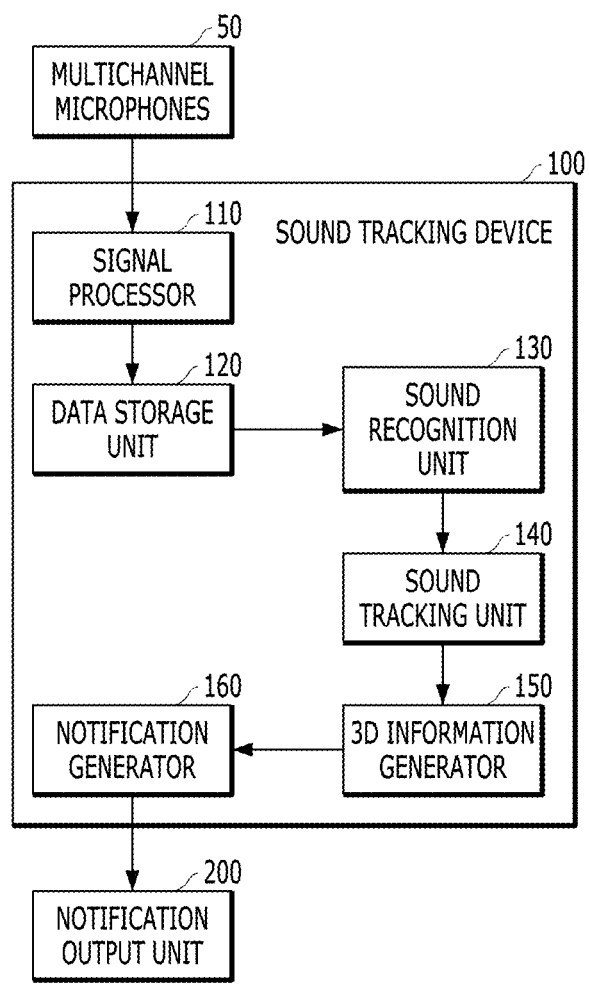
FIG. 2 is a detailed block diagram of a sound tracking device shown in FIG. 1.

FIG. 2 is a detailed block diagram of the sound tracking device shown in FIG. 1.

Referring to FIG. 2, the sound tracking device 100 may include a signal processor 110, a data storage unit 120, a sound recognition unit 130, a sound tracking unit 140, a three-dimensional (3D) information generator 150, and a notification generator 160. The sound tracking device 100, which is designed for a vehicle, may be implemented as a part of a head unit of the vehicle 10. However, the scope of the present disclosure is not limited thereto.

The multichannel microphones 50 may sense sounds produced around the vehicle 10, generate sound data through analog-to-digital conversion, and transmit the sound data to the signal processor 110.

There are various sounds in the vicinity of the vehicle 10. For example, an engine sound or tire friction sound of other vehicles located around the vehicle 10, sounds generated from traffic lights, electronic displays, etc. and sounds of nature are present.

During driving, the driver desires to be aware of the state of a vehicle traveling at the rear left or right side of the vehicle 10 or at the rear side of the vehicle 10 (e.g., whether the vehicle intends to pass the vehicle 10), which cannot be seen from the front or side of the vehicle 10 and also desires to be aware of a relative location of the vehicle.

Some external sounds are not transferred to the driver because they are blocked by a soundproof system of the vehicle 10. Upon hearing a horn sound outside the vehicle 10, the driver desires to be aware of in which direction this horn sound is produced and whether the horn sound is directed at the vehicle 10 thereof. Depending on whether the driver recognizes the horn sound, the driver may take various measures including, for example, decelerating the vehicle, changing lanes, and operating an emergency light.

The driver may fail to hear the horn sound as the volume of an audio system of the vehicle 10 is too high. In this case, it is necessary to inform the driver of the fact that the horn sound has occurred around the vehicle 10 of the driver, in a visual manner or through the audio system of the vehicle 10.

The driver may be interested in other sounds, for example, a big friction sound generated by friction between the tires and the ground when a vehicle makes a sudden stop. This friction sound may be related to occurrence of a traffic accident or a situation immediately before a traffic accident and thus the driver needs to pay attention to driving. As another example, an impact sound occurs when there is an accident caused by collision between vehicles. If information about a direction in which an impact sound is produced is provided to the driver who has recognized the impact sound made at the front or side of the vehicle 10, a subsequent accident may be prevented.

If a siren is sounded from a police car or an ambulance near the vehicle 10, the driver should take a measure such as changing lanes so that the police car or the ambulance can pass. In a particular case, the driver may be legally punished for not taking necessary measures. Therefore, the driver needs to recognize the siren sound produced by a vehicle belonging to a public organization.

The signal processor 110 may perform noise filtering on the acquired sound data. Through noise filtering, various noises that cannot be used to recognize features or sources of sounds may be eliminated. Most sounds in which the driver is interested, such as a horn sound, a siren sound, a tire friction sound, and an impact sound, have sufficiently high decibel levels (e.g., 70 dB or more). Therefore, the signal processor 110 may determine whether the decibel level (i.e., magnitude) of the noise-eliminated sound data is equal to or higher than a reference value. That is, sound data, the magnitude of which is less than the reference value, may be eliminated by the signal processor 10.

The data storage unit 120 may store the noise-eliminated sound data. The data storage unit 120 may store the sound data on a frame basis and provide the sound data to the sound recognition unit 130 on a frame basis. Herein, the frame may mean sound data collected at the same time. An interval between frames may have a specific period (e.g., 40 ms or 100 ms) but the scope of the present disclosure is not limited thereto.

The sound recognition unit 130 recognizes the features of the sound data. Even when the decibel level of any sound data is higher than the reference value, such sound data may not be important to the driver. For example, sound produced when a train passes or noise of an airplane around an airport may not greatly have an effect on driving although it has a considerably high decibel level. Nor may noise produced during recovery or reorganization construction of a road may greatly have an effect on driving. Rather, continuously notifying the driver of the sound data of such noise may slow a response rate of the driver or may cause the driver not to respond to a situation that the driver should recognize.

The sound recognition unit 130 extracts feature values from the sound data received from the data storage unit 120 in the time domain and the frequency domain. The sound recognition unit 130 may build the mean and variance of the feature values as a database. The feature values may be values of Mel-frequency cepstral coefficients (MFCCs), total spectrum power, sub-band spectrum power, and/or pitch frequency. The sound recognition unit 130 may store, in the database, the mean and variance of sound data for frames of a predetermined time period, e.g., 100 ms.

In the field of sound signal processing, Mel-frequency cepstrum (MFC) is a representation of the short-term power spectrum of a signal, based on a cosine transform of a log power spectrum on a nonlinear Mel scale in the frequency domain. MFCCs are coefficients that collectively make up an MFC. MFCCs are acquired by applying pre-emphasis filtering to short-term voice data (signals), performing discrete Fourier transform (DFT) on the pre-emphasis filtered voice data, generating a power spectrum using Mel-scale filter banks, taking logarithms of respective Mel-scale powers, and performing discrete cosine transform (DCT) on the log Mel-scale powers.

A total power spectrum represents the energy distribution of a total spectrum within a predetermined frame duration. Typically, sub-band powers represent energy distribution values of the spectrum in four sub-band intervals such as [0, ⅛ f0], [⅛ f0, ¼ f0], [¼ f0, ½ f0], and [½ f0, f0]. A pitch frequency may be acquired by detecting the peak of a normalized autocorrelation function.

The sound recognition unit 130 may determine whether the acquired sound data is a sound in which a user is interested by classifying feature values of the acquired sound data through a classifier. The classifier may be one of a neural network (NN) classifier, a support vector machine (SVM) classifier, and a Bayesian classifier.

In this specification, the NN classifier will be described by way of example of the classifier.

The classifier of the sound recognition unit 130 may classify sounds into a plurality of classes according to the types of the sounds and calculate a confidence level based on similarity between acquired sound data and the plurality of classes by use of feature values of the sound data. That is, the confidence level may represent a probability that the sound data corresponds to the sound of a specific class. The total sum of confidence levels may be 1.

The result of classifying sounds produced by the classifier of the sound recognition unit 130 may include information about respective classes, types of sounds corresponding to the respective classes, and confidence levels corresponding to the respective classes.

The sound recognition unit 130 may generate a determination result according to whether the confidence level is equal to or higher than a reference value (e.g., 0.7) and include the determination result in the sound classification result. That is, if the confidence level is equal to or higher than the reference value, the sound recognition unit 130 may determine the type of a sound of a class corresponding to the confidence level as the type of current sound data.

Accordingly, the sound recognition unit 130 may generate the sound classification result which is information about the type of a sound corresponding to the sound data, by analyzing the features of the sound data.

The sound tracking unit 140 may track a direction in which a sound is produced, based on the sound data for a sound type (or target sound source) of a class having the confidence level equal to or higher than the reference value. The sound type may be provided by the sound recognition unit 130.

The sound tracking unit 140 may accumulate sound data corresponding to consecutive frames to recognize the sameness of sounds input to respective microphones based on temporal features (waveforms) of the sounds, compare the magnitudes of the same sound, and calculate a difference in an arrival time of a sound reaching the respective microphones. The temporal features may be provided by the sound recognition unit 130.

The magnitude of sound is inversely proportional to the square of the distance from a source. Therefore, when a distance from a location at which a sound is produced doubles, the magnitude of the sound decreases to ¼ (to about 6 dB). Assuming that the width and length of a typical vehicle is about 2 m and about 3 m, respectively, the difference in magnitude of a sensed sound may have a sufficiently meaningful value depending on the location of a point at which the sound is generated.

For example, when the multichannel microphones 50 are disposed as illustrated in FIG. 1 and a sound is produced at an upper right side of the vehicle, the magnitude of a sound sensed by the microphone located at the upper side of the vehicle is higher than the average of the magnitudes of sounds sensed by the microphones located at the lower left and right sides of the vehicle. In addition, the magnitude of a sound sensed by the microphone located at the lower right side is higher than the magnitude of a sound sensed by the microphone located at the lower left side of the vehicle.

These properties are used to track an approximate direction based on the center of the vehicle 10 using the magnitudes of the sound collected from the respective microphones.

In addition, an angle corresponding to a location at which a sound is produced may be calculated using the difference (signal delay) between the arrival times of a sound that reaches the respective microphones. The sound tracking unit 140 pre-stores a table in which the angle corresponding to a location at which a sound is produced and the signal delay corresponding to each microphone are mapped. For example, when there are three multichannel microphones 50, t1 (a signal delay corresponding to a first microphone), t2 (a signal delay corresponding to a second microphone), and t3 (a signal delay corresponding to a third microphone) are mapped to an angle of one degree in the table and the probability of presence of a tracking object at the angle of one degree may be calculated by applying the signal delays of t1, t2 and t3 to sound data for the respective microphones stored in the data storage unit 120 and then summing the results of the application. When two multichannel microphones 50 are present as illustrated in FIG. 1, signal delays corresponding to the respective microphones may be mapped to an angle corresponding to a location at which a sound is produced in the range of 180 to 360 degrees in the table. The probability of presence of a tracking object at the angle of one degree may be calculated by applying the signal delays of t1 and t2 to sound data for the respective microphones stored in the data storage unit 120 and then summing the results of the application.

That is, the probability that an object to be tracked is present at each angle may be obtained by applying delay values for all angles to a current signal. Thus, the location at which a sound is produced may be estimated. This is possible because the angle corresponding to the location at which the sound is produced has a one-to-one correspondence with a combination of signal delays corresponding to the respective microphones.

The sound tracking unit 140 may generate a sound tracking result at each angle (based on the center of the vehicle 10 or the center of the back of the vehicle 10) in each of consecutive frames over time by use of the above information.

In other words, as an embodiment, the sound tracking result may be represented as an angle between the center of the back of the vehicle 10 and a neighbor vehicle. An angle between the center of the back of the vehicle 10 and a sound source may be defined as a sound source tracking angle value and the sound source tracking angle value may be regarded as the sound tracking result.

The sound tracking result may be information about a probability that an object corresponding to a target sound source is present at each angle in each of consecutive frames over time.

In this specification, it is assumed that the target source is limited to a friction sound of tires of the vehicle. Therefore, the sound tracking result may be information about a probability that a vehicle (hereinafter, a "neighbor vehicle") travelling around an object (the vehicle 10) (hereinafter, a "host vehicle") corresponding to the friction sound of tires is present at each angle in each of consecutive frames over time.

The 3D information generator 150 may generate 3D coordinates of a location at which a target sound source is present based on the difference in arrival times of sounds reaching respective microphones. The 3D coordinates represent coordinates on a spatial coordinate system centering on any one of the multichannel microphones. Meanwhile, the 3D information generator 150 may not calculate 3D coordinates of a target sound source, notification about which is not needed, and may not perform notification.

The 3D information generator 150 may generate information about an angle between the host vehicle and the neighbor vehicle using the 3D coordinates of a location at which a sound source is present. The information about the angle may be information about an angle formed by a connection axis of the neighbor vehicle and the center of the rear side of the host vehicle based on the rear side of the host vehicle as a reference axis.

The notification generator 160 may generate information about a target sound source (e.g., location, velocity, and angle) based on the 3D coordinates of the target source. The notification generator 160 may generate a synthesized image by matching the 3D coordinates of the target sound source to an image captured by an external device (e.g., a rear camera) of the sound tracking device 100.

A notification output unit 200 provides the driver with the information about the target sound source based on information about the neighbor vehicle provided by the sound tracking device 100. The notification output unit 200 may visually or acoustically provide the information about the target sound source. The notification unit 200 may also provide the information in both visual and acoustic methods.

The notification output unit 200 may be implemented by a head up display (HUD) or a cluster mounted in the vehicle 10 to visually provide information about a sound generating area. The notification output unit 200 may also be implemented in a navigation system connected to the sound tracking device 100 through wired communication such as a controller area network (CAN bus) or in a smart device (a smartphone, a tablet, a smartwatch, etc.) connected to the sound tracking device 100 through short-range wireless communication such as Bluetooth, NFC, or Wi-Fi.

The notification generator 160 may capture an image from a rear camera and generate a synthesized image by matching and synthesizing a location icon of at least one target sound source to an image in consideration of the difference in a 3D location between the location of the rear camera, an image capture direction, a field of view (FOV), and the multichannel microphones 50.

A plurality of target source sources may be present in one frame as a result of sound tracking. The sound tracking device 100 may perform an operation for independently tracking each target sound source.

The notification output unit 200 provides the driver with information about the target sound source based on information about the neighbor vehicle provided by the sound tracking device 100. In particular, the notification output unit 200 may provide the driver with a screen capable of intuitively recognizing the location of the target sound source from an image of the rear camera by generating a visual image on a display.

In other words, the sound tracking device 100 may synthesize the 3D coordinates of the target sound source with the image of the rear camera and then display the synthesized image, so that the driver may intuitively recognize the location of the target sound source from the image of the rear camera.

Figure 3:
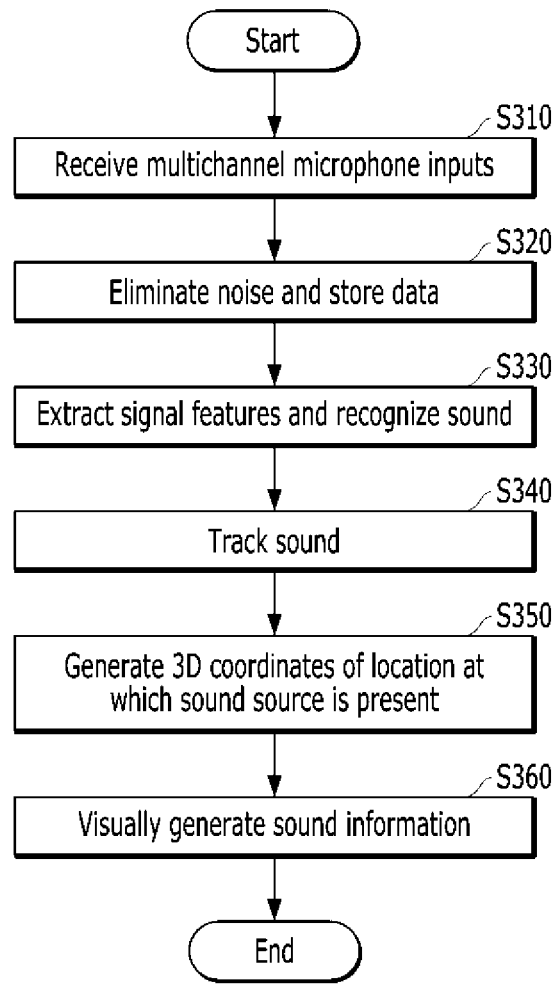
FIG. 3 is a flowchart illustrating operation of the sound tracking device shown in FIG. 2.

FIG. 3 is a flowchart illustrating operation of the sound tracking device shown in FIG. 2. Referring to FIG. 3, operation of the sound tracking device 100 shown in FIG. 2, i.e., a method of providing sound tracking information, is illustrated.

The signal processor 110 may receive sound data generated through analog-to-digital conversion of a sensed sound generated around the vehicle 10 (S310).

The signal processor 110 may perform noise filtering on the received sound data and the data storage unit 120 may store the noise-eliminated sound data (S320).

The sound recognition unit 130 may extract feature values of the sound data received from the data storage unit 120 in the time domain and frequency domain and generate a sound classification result by classifying the feature values through a classifier (S330).

The sound tracking unit 140 may generate a sound tracking result which is information, provided with respect to each angle, about a probability that an object corresponding to a type of a sound class having a confidence level equal to or higher than a reference value in the sound classification result is present based on the sound data in each of consecutive frames over time (S340).

The 3D information generator 150 may generate 3D coordinates of a location at which a target sound source is present based on the sound tracking result (S350).

The notification generator 160 visually generates sound information (S360).

Hereinafter, a detailed method will be described of providing, as visualization information, the driver with the 3D coordinates indicating a location at which the target sound source is present based on the sound source tracking result with reference to FIGS. 4 to 9.

FIGS. 4(*a*)-4(*b*) are schematic views illustrating a method of visually displaying a sound signal of a rear vehicle according to an embodiment of the present disclosure.

Referring to FIG. 4 (*a*), a host vehicle may include a rear camera installed at the rear side thereof. The rear camera may continue to provide an image of the rear side of the vehicle or may provide the image of the rear side of the vehicle only in a particular case, while the vehicle travels.

For example, when it is judged that the host vehicle changes lanes (e.g., when a turn signal lamp is turned on or when a variation value of a steering angle of a steering wheel exceeds a threshold value), an image captured by the rear camera may be provided to the driver.

With emergence of a mirrorless vehicle in which a side mirror is not installed, the rear camera may continue to provide the driver with an image obtained by capturing a rear situation of the vehicle while the vehicle travels.

Although the rear camera may operate in linkage with a blind spot detection (BSF) system, the rear camera may continuously capture an image of the rear side or rear left or right side of the vehicle independently of the BSD system and provide the captured image to the driver.

Meanwhile, the driver may have a difficulty in recognizing the location of a neighbor vehicle only by image information generated by the rear camera as illustrated in FIG. 4(*a*). That is, it may be difficult for the driver to recognize the distance between the host vehicle and the neighbor vehicle only by the image information. In addition, if water drops are formed on the lens of the rear camera or if there are foreign substances on the rear camera, it may be difficult to read the image information. Further, an image of the rear camera may be invisible at night or in bad weather.

In this situation, the present disclosure is devised to improve visibility by visually providing location information of the neighbor vehicle to the driver using a sound signal in addition to image information captured by the rear camera, thereby aiding the driver in making a decision such as whether to change lanes.

Referring to FIG. 4(*b*), an icon (a first icon) indicating a vehicle (object) is displayed on the object displayed on image information captured by the rear camera. The first icon may indicate a neighbor vehicle located around the host vehicle, in particularly, at the rear side of a host vehicle.

The first icon may be displayed according to location information generated as a result of sound tracking from a sound signal generated by the neighbor vehicle. The first icon may include probability information indicating a probability that the neighbor vehicle is present in an area indicated by the location information.

For example, a plurality of blocks having different colors or having different color depths may be displayed in an area in which the neighbor vehicle is displayed as illustrated in FIG. 4(*b*). As a color depth is darker, a probability that the neighbor vehicle is present in an area of location information indicating a location at which a target sound source generated based on the sound source tracking result is present is high.

Together with the neighbor vehicle, lanes in which the neighbor vehicle is located may be displayed on the image information through an additional icon (a second icon).

The driver may be provided with the first icon indicating the neighbor vehicle, the probability information included in the first icon, and the second icon indicating lanes through the image information, that are helpful for the driver to perform overall vehicle control such as change of lanes.

Figure 5:
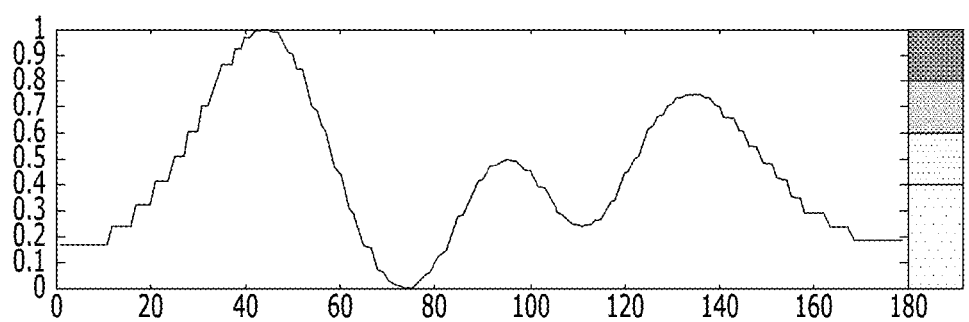
FIG. 5 is a graph illustrating a sound tracking result as a probability distribution according to an embodiment of the present disclosure.

FIG. 5 is a graph illustrating a sound tracking result as a probability distribution according to an embodiment of the present disclosure.

Referring to FIG. 5, a reference axis of the rear side of a host vehicle may be indicated on the X axis and a sound tracking result generated by a sound signal received from a neighbor vehicle may be indicated as probability information on the Y axis. The sound tracking result may be information about a probability that an object corresponding to a target sound source is present with respect to each angle in each of consecutive subframes in real time.

The notification output unit 200 may match the sound tracking result to a color according to a distribution of a probability that a neighbor vehicle is present. The notification output unit 200 may be configured to match an angle having a tracking pattern of a high probability to a dark color according to the magnitude of the probability distribution.

A probability that the neighbor vehicle is present at an angle of around 40 degrees approximates to 1 and the probability at an angle of around 140 degrees approximates to 0.7. To visually provide the probability that the vehicle is present to the driver, a sound source tracking degree at which the probability is 1 to 0.8 may be displayed in red, a sound source tracking degree at which the probability is 0.8 to 0.6 may be displayed in yellow, and a sound source tracking degree at which the probability is 0.6 to 0.4 may be displayed in green.

Although a probability that the neighbor vehicle is to be located at the sound source tracking angle may be displayed according to color, the probability may be displayed according to depth of the same color according to another embodiment. The driver can intuitively recognize the probability that the neighbor vehicle is present according to angle and thus can easily make a decision on overall travelling control such as determination as to whether to change lanes.

Figure 4A:
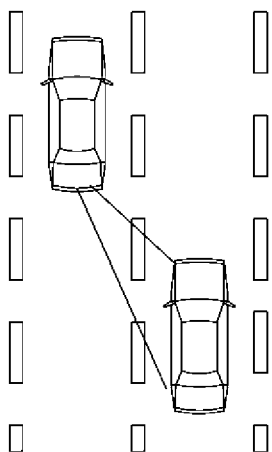
FIGS. 4(a) and 4(b) are schematic views illustrating a method of visually displaying a sound signal of a rear vehicle according to an embodiment of the present disclosure.
Figure 4B:
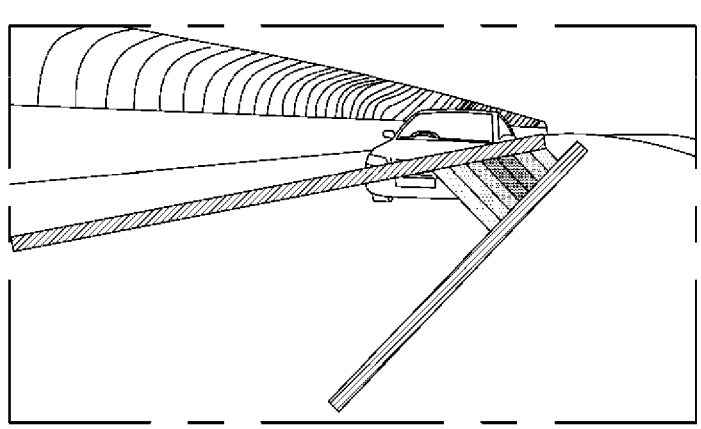
Figure 6:
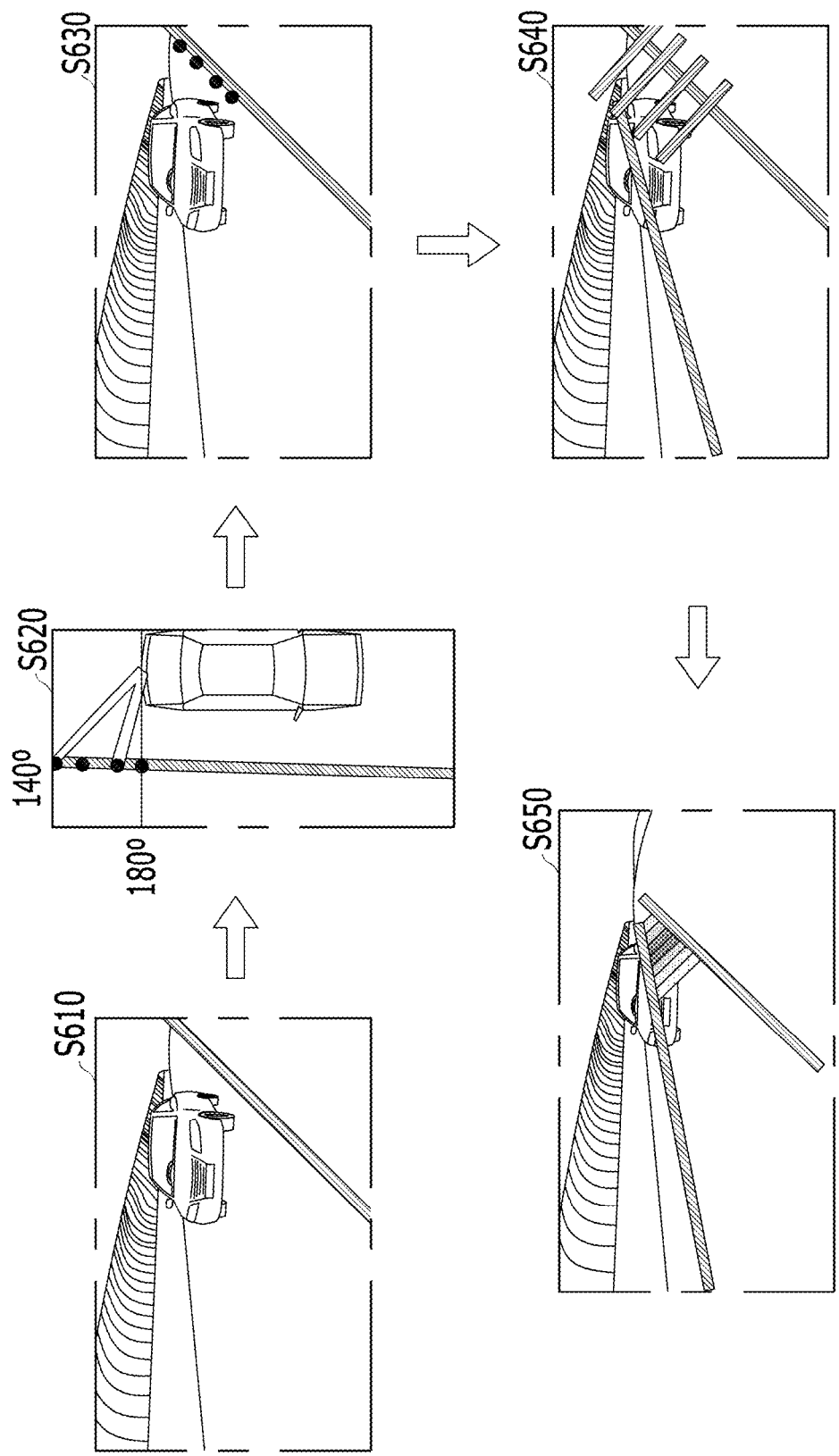
FIG. 6 is a schematic view illustrating a method of matching a rear camera shown in FIG. 4(b) to a camera image.
Figure 7:
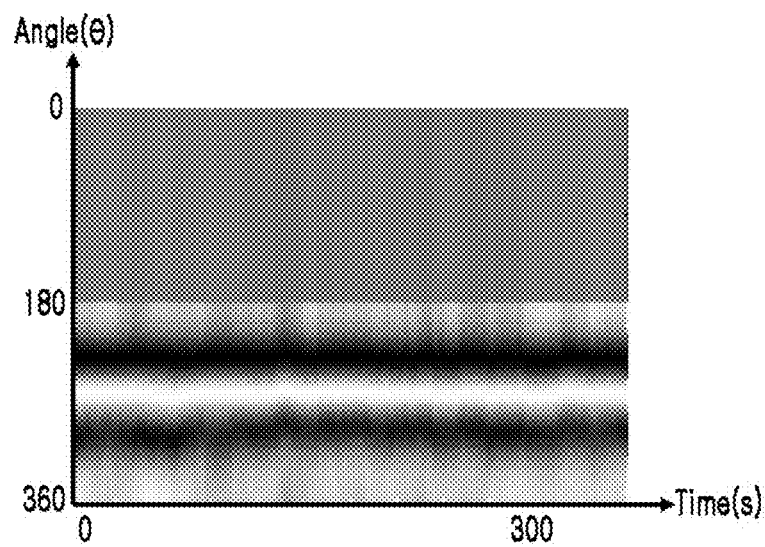
FIG. 7 is a graph illustrating a tracking result of a sound tracking device according to an embodiment of the present disclosure.

FIG. 6 is a schematic view illustrating a method of matching a rear camera shown in FIG. 4(b) to a camera image, and FIG. 7 is a graph illustrating a tracking result of a sound tracking device according to an embodiment of the present disclosure.

The sound tracking result of FIG. 7 may be used for the matching method of FIG. 6. Therefore, the matching method will be described with reference to FIGS. 6 and 7.

Referring to FIG. 6, an icon displayed together with image information captured by a rear camera (e.g., a camera of a mirrorless vehicle) may be displayed through pixel matching based on detected lane information and/or a sound source tracking result (e.g., a sound source tracking angle value) of a neighbor vehicle. In other words, colors according to the magnitude of a sound corresponding to an angle value may be displayed through matching between a pixel on a display and a sound source tracking angle.

The notification output unit 200 may extract lane information from the image information of the rear camera. The notification output unit 200 may extract only a lane located between a host vehicle and a neighbor vehicle (object) from among a plurality of lanes displayed on the image information (S610).

The notification output unit 200 may calculate an angle between the host vehicle and the neighbor vehicle using a side lane of the recognized neighbor vehicle, i.e., a lane between the host vehicle and the neighbor vehicle (S620).

Information about the angle may be set to information about an angle formed by a connection axis of the neighbor vehicle and the center of the rear side of the host vehicle based on the rear side of the host vehicle as a reference axis.

The angle may be determined by location information according to a sound tracking result. In relation to this, referring to FIG. 7, the location of the neighbor vehicle according to time may be represented as information about an angle between the host vehicle and the neighbor vehicle.

FIG. 7 illustrates information about an angle between the neighbor vehicle and the host vehicle from 0 to 180 degrees based on the rear side of the host vehicle. FIG. 7 may illustrate information about a probability that the neighbor vehicle is present as the sound resource tracking result. In FIG. 7, the probability that the neighbor vehicle is present is high in two areas indicated by deep concentration. There is a high probability that a sound source is to be produced at an angle of 220 and 300 degrees based on the rear side of the host vehicle.

The notification output unit 200 may calculate an included angle using a sound source tracking angle at which a sound source is present and display the angle on a lane (a first lane) located between the host vehicle and the neighbor vehicle (S630).

The notification output unit 200 may display, on the first lane, at least one sub-block which is vertical to the first lane at crossing points between the first lane and the connection axis of the host vehicle and the neighbor vehicle (S640).

The sub-block may be displayed by use of a different color or color depth in order to indicate information about a probability that the neighbor vehicle is present in the location information generated according to the sound source tracking result (S650).

The color of the sub-block of an area in which a probability that the neighbor vehicle is present is high as the sound source tracking result of FIG. 5 may be displayed as red and the color of the sub-block of an area in which the probability is low may be displayed as green.

Figure 8:
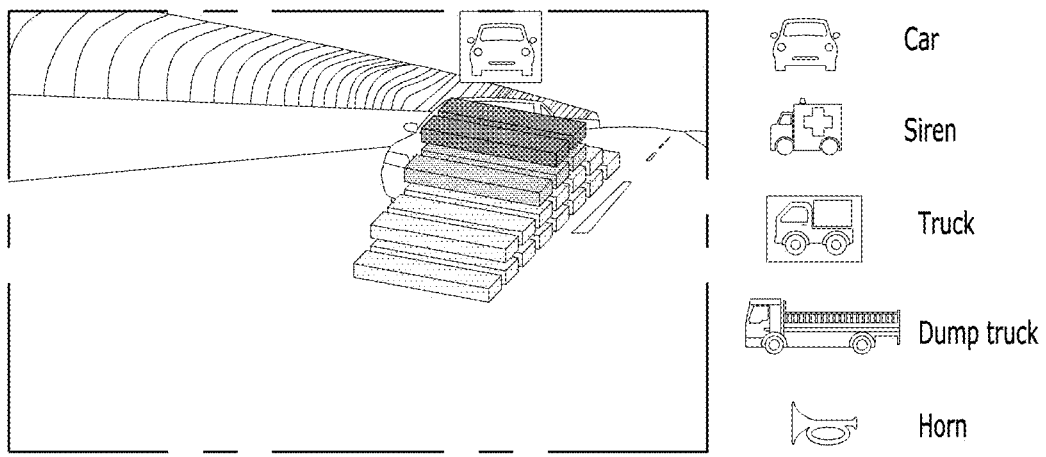
FIG. 8 is a schematic view illustrating a method of visually outputting a sound tracking result in a 3D manner according to another embodiment of the present disclosure.
Figure 9:
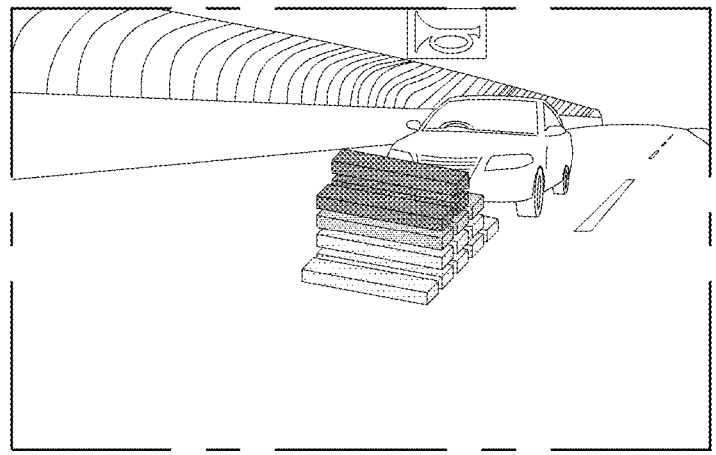
FIG. 9 is a schematic view illustrating another method of visually outputting a sound tracking result of FIG. 8 in a 3D manner according to another embodiment of the present disclosure.

FIG. 8 is a schematic view illustrating a method of visually outputting a sound tracking result in a 3D manner according to another embodiment of the present disclosure, and FIG. 9 is a schematic view illustrating another method of visually outputting a sound tracking result of FIG. 8 in a 3D manner according to another embodiment of the present disclosure. The method of FIG. 9 is similar to that of FIG. 8. A description of the method will be given with reference to FIGS. 8 and 9.

The notification output unit 200 may display information about a probability that a neighbor vehicle is present in an area indicated by location information generated by a sound source tracking result. While the notification output unit 200 may display the probability information on a plane as illustrated in FIG. 6, the notification output unit 200 may display the probability information in a 3D manner as illustrated in FIGS. 8 and 9.

The notification output unit 200 may display the probability information by stacking sub-blocks as a method of visualizing the probability information in a location area of image information corresponding to a sound source tracking angle value. The notification output unit 200 may stack high sub-blocks for an angle at which the probability that a neighbor vehicle is present is high with respect to sound source tracking angles and differently display a different color according to the height of sub-blocks.

In addition, the notification output unit 200 may calculate features of a sound source in the frequency domain and time domain and display information about a type of the neighbor vehicle based on a result of analyzing a sound signal.

Although not illustrated in FIG. 8, the notification output unit 200 may recognize an abnormal tire friction sound (e.g., a tire friction sound that may be generated during sudden stop in a car accident) and an impact sound. Upon receiving a sound signal corresponding to the friction sound or impact sound, the notification output unit 200 may generate an icon indicating the friction sound or impact sound and give the driver a warning.

Referring to FIG. 9, when the neighbor vehicle generates a horn sound, the notification output unit 200 may analyze a sound signal of the horn sound and, upon determining that the sound signal is the horn signal, display an icon indicating the horn sound.

Figure 10:
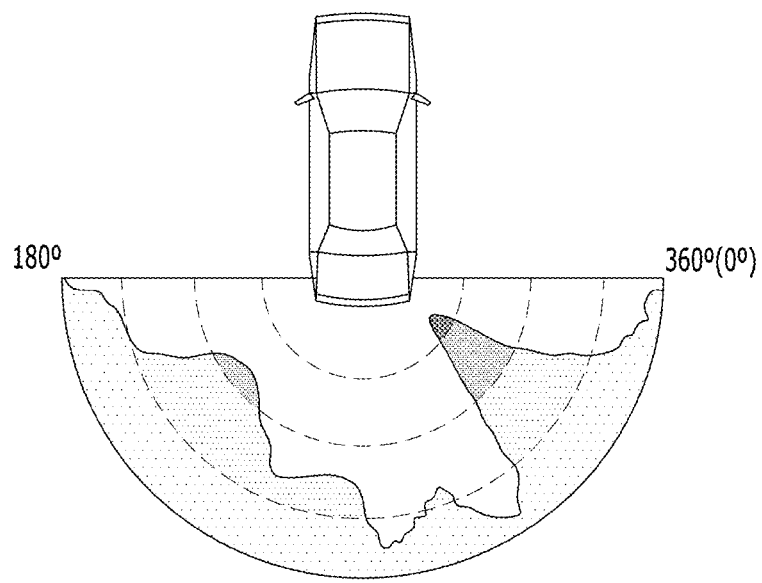
FIG. 10 is a schematic view illustrating a method of outputting a sound tracking result using an aerial view according to an embodiment of the present disclosure.

FIG. 10 is a view illustrating a method of outputting a sound tracking result using an aerial view according to an embodiment of the present disclosure.

Referring to FIG. 10, the sound tracking result illustrated as an aerial view may be provided to the driver.

The probability distribution of FIG. 5 may match the rear side of a host vehicle focusing on the center of the rear side of the host vehicle as the center of a semicircle. The notification output unit 200 may display the probability distribution of FIG. 5 by matching with a semicircle region of the rear side of the host vehicle.

The notification output unit 200 may include a plurality of displays. As one embodiment, the notification output unit 200 may visually provide the driver with the sound source tracking result on at least one of a display included in an AVN system of the vehicle, a separate mirrorless camera output unit, and a display included in an HUD or a cluster.

The driver may recognize the fact that a probability that a neighbor vehicle is present is high at around 40 degrees based on the center of the rear side of the host vehicle by recognizing an area represented as red at an angle of around 40 degrees. The driver may also determine that another vehicle may be present in an area recognized as an angle of around 140 degrees through an area displayed as orange color at an angle of around 140 degrees.

The apparatus and method of providing visualization information of a rear vehicle according to the present disclosure have the following effects.

Firstly, the present disclosure can aid a driver in intuitively recognizing a neighbor vehicle by converting external auditory information of a vehicle into visualization information and providing the visualization information to the driver of the vehicle.

Secondly, the present disclosure can improve visibility of the driver by providing visualization information in addition to auditory information to the driver in a situation in which an image of a rear camera is not clear (e.g., at night or in bad weather).

Thirdly, the present disclosure can provide information about the type of a neighbor vehicle as well as location information of the neighbor vehicle and display information about sound (e.g., a horn sound) as well as information about the vehicle.

Fourthly, the present disclosure can aid the driver in deciding whether to change lanes by displaying information about lanes in which a vehicle and a neighbor vehicle are located together with information about the location of the neighbor vehicle.

Fifthly, the present disclosure can visually provide sound information around a vehicle even to a driver who cannot hear an external sound.

It will be appreciated by persons skilled in the art that that the effects that can be achieved through the present disclosure are not limited to what has been particularly described hereinabove and other advantages of the present disclosure will be more clearly understood from the above detailed description.

The method according to the above-described embodiment may be implemented as a computer-executable program that can be recorded in a computer-readable medium. Examples of the computer-readable medium include a read only memory (ROM), a random access memory (RAM), a compact disc (CD)-ROM, a magnetic tape, a floppy disk, an optical data storage, and a carrier wave (e.g., data transmission over the Internet).

The computer-readable recording medium can be distributed over a computer system connected to a network so that computer-readable code is written thereto and executed therefrom in a decentralized manner. Functional programs, code, and code segments needed to realize the above-described method can be easily derived by programmers skilled in the art.

Those skilled in the art will appreciate that the present disclosure may be embodied in other specific forms than those set forth herein without departing from the spirit and essential characteristics of the present disclosure.

The above detailed description is therefore to be construed in all aspects as illustrative and not restrictive. The scope of the disclosure should be determined by reasonable interpretation of the appended claims and all changes coming within the equivalency range of the disclosure are within the scope of the disclosure.

What is claimed is:

1. A method of providing visualization information of a rear vehicle, the method comprising:
   calculating, by a controller, a location of a sound source located behind a host vehicle, using a sound signal received by each of a plurality of microphones;
   matching information about the location, by the controller, with any one of at least one object displayed on image information generated by a rear camera;
   detecting, by the controller, lanes included in the image information; and
   displaying, by an output unit, a first icon indicating the object on the image information and the detected lanes by matching the detected lanes with a second icon indicating lane information,
   wherein the first icon includes information about a probability that the object is present in an area indicated by the location information,
   wherein when matching the detected lanes with the second icon indicating the lane information, a first lane located between the host vehicle and the object from among the lanes included in the image information is detected,
   wherein the first icon includes, on the first lane, at least one sub-block which is vertical to the first lane at a crossing point between a connection axis of the object and the first lane,
   wherein the location information includes information about an angle between the host vehicle and the object, and
   wherein the angle is formed by the connection axis of the object and a center of a rear side of the host vehicle based on the rear side of the host vehicle as a reference axis.

2. The method according to claim 1, wherein the probability information is displayed as at least one figure indicating the probability considering the magnitude of the sound signal.

3. The method according to claim 2, wherein the sub-block is represented as a different color or a different color depth according to the probability.

4. The method according to claim 2, wherein the sub-block has a different height according to the probability.

5. The method according to claim 1, wherein the probability information is displayed as at least one figure indicating the probability considering a distance between the host vehicle and the object.

6. An apparatus for providing visualization information of a rear vehicle, the apparatus comprising:
   a plurality of microphones configured to receive a sound signal from a sound source located behind a host vehicle;
   a controller configured to calculate a location of the sound source, using the sound signal, match information about the location with any one of at least one object displayed on image information generated by a rear camera, and detect lanes included in the image information; and
   an output unit configured to display a first icon indicating the object on the image information and the detected lanes by matching the detected lanes with a second icon indicating lane information, wherein the first icon includes information about a probability that the object is present in an area indicated by the location information, wherein when matching the detected lanes with the second lanes indicating the lane information, a first lane located between the host vehicle and the object from among the lanes included in the image information is detected, wherein the first icon includes, on the first lane, at least one sub-block which is vertical to the first lane at a crossing point between a connection axis of the object and the first lane, wherein the location information includes information about an angle between the host vehicle and the object, and wherein the angle is formed by the connection axis of the object and a center of a rear side of the host vehicle based on the rear side of the host vehicle as a reference axis.

7. The apparatus according to claim 6, wherein the probability information is displayed as at least one figure indicating the probability considering the magnitude of the sound signal.

8. The apparatus according to claim 7, wherein the sub-block is represented as a different color or a different color depth according to the probability.

9. The apparatus according to claim 7, wherein the sub-block has a different height according to the probability.

10. The apparatus according to claim 6, wherein the probability information is displayed as at least one figure indicating the probability considering a distance between the host vehicle and the object.

11. An apparatus for providing visualization information of a rear vehicle, the apparatus comprising:

a plurality of microphones configured to receive a sound signal from a sound source located behind a host vehicle;

a controller configured to calculate a location of the sound source, using the sound signal and match information about the location with any one of at least one object displayed on image information generated by a rear camera; and an output unit configured to display a first icon indicating the object on the image information, wherein the first icon includes information about a probability that the object is present in an area indicated by the location information, wherein the first icon indicating the object, the probability information included in the first icon, and a second icon indicating lanes are displayed on the image information simultaneously, when the first icon is displayed, wherein the location information includes information about an angle between the host vehicle and the object, and wherein the angle is formed by a connection axis of the object and a center of a rear side of the host vehicle based on the rear side of the host vehicle as a reference axis.

* * * * *